Patented Nov. 7, 1933

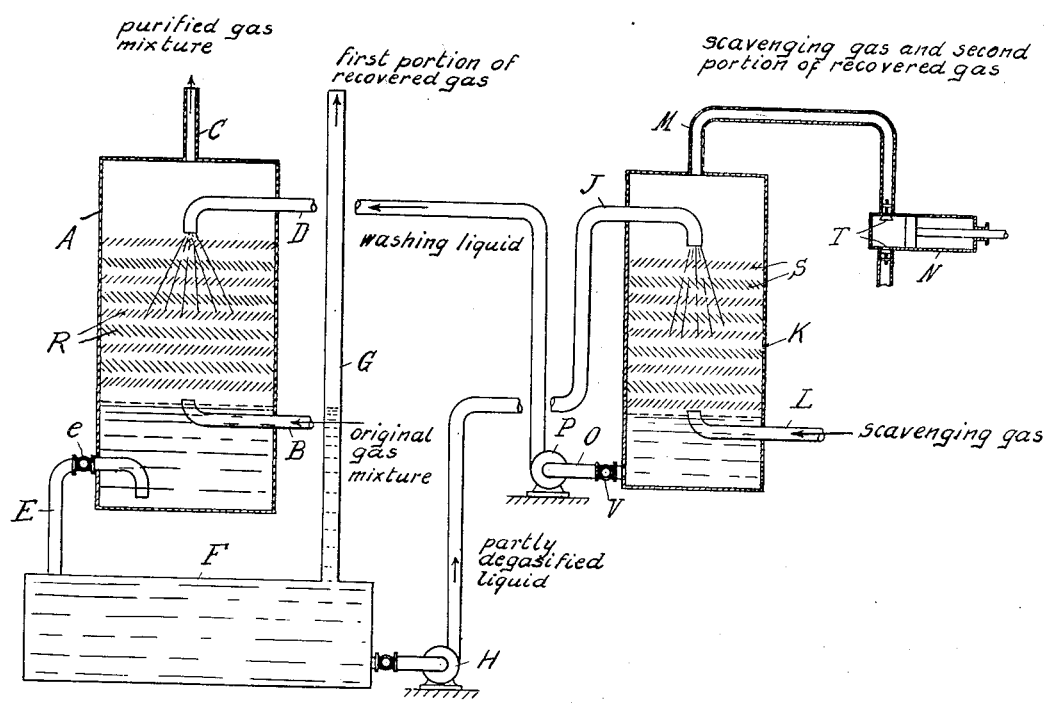

1,933,734

UNITED STATES PATENT OFFICE 1,933,734

RECOVERY OF HYDROGEN

Günther Hornung, Bochum, Germany

Application July 15, 1930, Serial No. 468,044, and in Germany July 20, 1929

1 Claim. (Cl. 23—210)

My invention refers to the treatment of gas mixtures for the recovery therefrom of hydrogen and has particular reference to means whereby hydrogen can be recovered from industrial gas mixtures in a simpler and yet more efficient manner than was hitherto possible.

As is well known to those skilled in the art, the hydrogen required in the manufacture of ammonia and for other industrial purposes is nowadays largely recovered from industrial gas mixtures including coke oven gas, water gas and illuminating gas. As a rule these gas mixtures are placed under a pressure of from 10-30 atms. and at the same time cooled down to very low temperatures, for inst. to 150–200° C. below zero. Before treating the gas mixture in this manner it must be freed from impurities, such as hydrogen sulfide, carbon dioxide and tarry constituents, preferably by placing the gas mixture under a pressure of about 10 atms. and washing it with water. In this washing operation not only the impurities mentioned above, but also valuable constituents, such as for inst. methane, hydrogen and heavy hydrocarbons, will dissolve in the water, these valuable constituents forming up to 7% by volume of the gases treated. In order to avoid these losses of valuable gases, it has been suggested to collect separately the gases escaping from the water on the pressure thereon being relieved. In this manner a combustible gas mixture having a heating value of about 5000 calories, can be obtained. However the water from which these gases have escaped, still contains in solution further quantities of gases, amounting to about 18% of the water volume.

It is an object of the present invention to provide means whereby the valuable constituents, such as hydrogen, methane, and heavy hydrocarbons, which are still dissolved in the water after part of the gases have escaped therefrom, can be recovered in a useful manner.

Hitherto the water, with the gases in solution therein, has been conducted over a wickerwork gradiator in order to free it from these gaseous constituents. However, this treatment involves a dilution of the gases with air, which renders them practically unfit for further use.

I have now found that if the water relieved from the pressure is caused to pass through an apparatus provided with baffles, and placed under a pressure below atmospheric pressure, there escapes at first a gas mixture, which has a heating value up to 2500 calories and is therefore fit for different uses.

By conducting scavenging gases through the water the yield of valuable gaseous constituents can be increased further. The scavenging is preferably effected by means of the gas mixture obtained in the decomposition, under pressure, of the gases, this mixture, owing to the high percentage of nitrogen contained therein, having hitherto been considered as unfit for further use.

*Example*

1000 cubic meters coke oven gas are washed with 200 cbms water whereby 70 cbms of gas are dissolved, while the remaining 930 cbms of the gas are directly introduced into an apparatus in which the gases are placed at a temperature of about 150–200° C. below zero under a pressure of about 10 atms. in order to recover the hydrogen therefrom.

The gas mixture dissolved in the washing water has the following composition:

| | Percent | Heating value: calories |
|---|---|---|
| $CO_2$ | 29.6 | |
| Heavy hydrocarbons | 8.0 | 1,156.0 |
| $O_2$ | 0.70 | |
| CO | 4.40 | 124.0 |
| $H_2$ | 25.00 | 711.0 |
| $CH_4$ | 23.90 | 2,270.0 |
| $N_2$ | 8.40 | |
| | | 4,261.0 |

The washing water is first relieved of the pressure. There escape 50 cbms of a gas mixture having the following composition:

| | Percent | Heating value: calories |
|---|---|---|
| $CO_2$ | 13.5 | |
| Heavy hydrocarbons | 6.4 | 1,927.4 |
| $O_2$ | 1.0 | |
| CO | 5.6 | 158.3 |
| $H_2$ | 34.0 | 967.0 |
| $CH_4$ | 30.0 | 2,850.0 |
| $N_2$ | 9.5 | |
| | | 5,902.7 |

The water remaining over is now introduced into an apparatus which will be described more fully hereinafter, and which is placed under a reduced pressure of ½ atm. In this apparatus escape 10 cbms of a gas mixture having a heating value of about 2500 calories and the following composition:

|  | Percent | Heating value: calories |
|---|---|---|
| $CO_2$ | 70.0 | |
| Heavy hydrocarbons | 11.4 | 1,627.6 |
| $O_2$ | 0.0 | |
| CO | 1.5 | 42.4 |
| $H_2$ | 2.8 | 74.6 |
| $CH_4$ | 9.0 | 855.0 |
| $N_2$ | 5.3 | |
|  |  | 2,599.6 |

By simultaneously conducting through this apparatus a scavenging gas, such as for instance the gas fraction, rich in nitrogen, which is obtained in the decomposition, under pressure, of the washed, but not dissolved starting gas mixture and having about the following composition:

| | Percent |
|---|---|
| $CO_2$ | 0.0 |
| $C_2H_4$ | 0.0 |
| $O_2$ | 0.2 |
| CO | 14.0 |
| $H_2$ | 3.2 |
| $CH_4$ | 24.2 |
| $N_2$ | 82.6 | about 7 cbms more of a valuable gas mixture are obtained, which has the following composition:

|  | Percent | Heating value: calories |
|---|---|---|
| $CO_2$ | 34.5 | |
| Heavy hydrocarbons | 6.1 | 870.9 |
| $O_2$ | 0.2 | |
| CO | 7.8 | 220.5 |
| $H_2$ | 2.9 | 82.5 |
| $CH_4$ | 12.1 | 1,149.5 |
| $N_2$ | 44.1 | |

The water derived from these gaseous constituents and containing only 3 cbms gas in solution can be used directly for the washing of further quantities of the original gas mixture.

In the drawing affixed to the specification and forming part thereof an apparatus adapted for carrying out the invention is illustrated diagrammatically by way of example in vertical section.

Referring to the drawing, A is a washing tower and B is a pipe through which the coke oven gas or other gas mixture to be treated is introduced into the tower under a pressure of about 10 atms. R are a number of super-imposed baffles extending across the tower A, these baffles being formed and arranged in any well known manner, being shown in the drawing in a purely conventional manner. The washing water enters the tower through the pipe D, the washed, but not dissolved, coke oven gases escape through pipe C to be conducted into the apparatus.

E is a bent pipe provided with a stop valve e, through which the washing water can escape into the container F, in which it is relieved altogether of the pressure lasting thereon. G is a vertical pipe mounted on the container F, through which part of the gaseous constituents dissolved in the washing water can escape. This part of the gases has a heating value of about 5000 calories.

From the container F the washing water is forced by a pump H through a pipe J into an apparatus K, provided with superposed baffles S and placed under a reduced pressure of about ½ atm. Scavenging gas is introduced into K through pipe L, and escapes, together with the gases hitherto dissolved in the water, through pipe M leading to the vacuum pump N, suitable valves T being inserted in the system. The gas escaping from the pump N, having a heating value of about 2500 cals. may be used for heating.

The water collecting in the bottom part of the apparatus K can escape through pipe O, in which a valve V is inserted, and is forced back by means of a pump P and through pipe D into the washer A.

Various changes may be made in the details disclosed in the foregoing specification without departing from the invention or sacrificing the advantages thereof.

I claim:

The method of recovering hydrogen gas from wash water under pressure containing hydrogen and other gases in solution, comprising causing such water to be finely subdivided, while simultaneously relieving it of the pressure thereon, allowing part of the hydrogen dissolved therein to escape for further use, subdividing the remaining water once more, causing a current of scavenging gas to flow in contact and in counter-current with said subdivided water and collecting said scavenging gas and the hydrogen escaping from said water.

GÜNTHER HORNUNG.